(12) United States Patent
Sato (10) Patent No.: US 6,655,972 B2
(45) Date of Patent: Dec. 2, 2003

(54) CARD CONNECTOR

(75) Inventor: Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/978,661

(22) Filed: Oct. 18, 2001

(65) Prior Publication Data

US 2002/0052132 A1 May 2, 2002

(30) Foreign Application Priority Data

Oct. 19, 2000 (JP) ........................................ 2000-319890

(51) Int. Cl.⁷ .............................................. H01R 13/62
(52) U.S. Cl. ...................................................... 439/159
(58) Field of Search ................................ 439/152, 159, 439/328

(56) References Cited

U.S. PATENT DOCUMENTS

| | | | |
|---|---|---|---|
| 4,810,200 A | 3/1989 | Sakamoto | 439/155 |
| 4,952,161 A | 8/1990 | Komatsu | 439/155 |
| 5,033,972 A | 7/1991 | Komatsu et al. | 439/153 |
| 5,051,101 A | 9/1991 | Komatsu | 439/159 |
| 5,145,389 A | 9/1992 | Okubo | 439/159 |
| 5,179,505 A | 1/1993 | Matsuo | 361/395 |
| 5,197,894 A | 3/1993 | Koike | 439/159 |
| 5,286,207 A | 2/1994 | McHugh | 439/64 |
| 5,492,480 A | 2/1996 | Fusselman et al. | 439/157 |
| 5,492,481 A | 2/1996 | Lewis | 439/159 |

(List continued on next page.)

FOREIGN PATENT DOCUMENTS

| | | |
|---|---|---|
| JP | 11-316110 | 11/1999 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/832,190, T. Takada et al., filed Apr. 11, 2001.
U.S. patent application Ser. No. 09/914,322, S. Sato, filed Aug. 27, 2001.
U.S. patent application Ser. No. 09/978,660, S. Sato, filed Oct. 18, 2001.
U.S. patent application Ser. No. 10/067,404, M. Ooya et al., filed Feb. 07, 2002.
U.S. patent application Ser. No. 10/090,153, T. Ito et al., filed Mar. 05, 2002.
U.S. patent application Ser. No. 10/102,826, S. Sato et al., filed Mar. 22, 2002.
U.S. patent application Ser. No. 10/102,928, K. Abe, filed Mar. 22, 2002.

*Primary Examiner*—Tho D. Ta
*Assistant Examiner*—Ann McCamey
(74) *Attorney, Agent, or Firm*—Finnegan, Henderson, Farabow, Garrett & Dunner LLP (57) ABSTRACT

A card connector reliably holds an inserted card by a compact mechanism to prevent the card from coming off due to unexpected external forces.

The card 10 is formed with the recessed portion 18 for engagement with the locking piece, and the elastic locking piece 50 is attached to the eject member 41 that slides together with the card 10. The elastic locking piece 50 is urged away from the card 10 so that when the elastic locking piece 50 is elastically reset to its original shape, the locking portion 50b disengages from the recessed portion 18 of the card 10. The locking piece guide means 60 guides and elastically deforms the elastic locking piece 50 to engage the locking portion 50b with the recessed portion 18 when the card is inserted and, when the card is ejected, resets the elastic locking piece 50 to disengage the locking portion 50b.

3 Claims, 9 Drawing Sheets

U.S. PATENT DOCUMENTS

| | | | |
|---|---|---|---|
| 5,533,906 A | 7/1996 | Abe | 439/159 |
| 5,597,316 A | 1/1997 | David et al. | 439/159 |
| 5,640,307 A | 6/1997 | Bleier et al. | 361/740 |
| 5,648,651 A | 7/1997 | Inoue | 235/475 |
| 5,655,918 A | 8/1997 | Soh | 439/159 |
| 5,674,080 A * | 10/1997 | Takemura | 439/159 |
| 5,695,351 A | 12/1997 | Kimura et al. | 439/159 |
| 5,703,346 A | 12/1997 | Bricaud et al. | 235/44.1 |
| 5,725,385 A | 3/1998 | Takano et al. | 439/64 |
| 5,740,012 A | 4/1998 | Choi | 361/686 |
| 5,871,365 A | 2/1999 | Kajiura | 439/159 |
| 5,890,920 A | 4/1999 | David et al. | 439/159 |
| 5,899,763 A | 5/1999 | Kajiura | 439/159 |
| 5,923,541 A | 7/1999 | Yasumi | 361/798 |
| 5,967,810 A | 10/1999 | Spickler et al. | 439/159 |
| 6,065,984 A | 5/2000 | Tung | 439/159 |
| 6,083,018 A | 7/2000 | Hara et al. | 439/159 |
| 6,095,834 A | 8/2000 | Lai et al. | 439/159 |
| 6,106,313 A | 8/2000 | Chen | 439/159 |
| 6,120,309 A | 9/2000 | Hara | 439/159 |
| 6,139,340 A | 10/2000 | Niitsu | 439/159 |
| 6,152,748 A | 11/2000 | Sato et al. | 439/159 |
| 6,159,027 A | 12/2000 | Kuo | 439/159 |
| 6,162,075 A | 12/2000 | Hara et al. | 439/159 |
| 6,174,197 B1 | 1/2001 | Hirata et al. | 439/541.5 |
| 6,200,148 B1 | 3/2001 | Yu | 439/159 |
| 6,210,187 B1 | 4/2001 | Tung | 439/159 |
| 6,227,879 B1 | 5/2001 | Dong | 439/92 |
| 6,231,360 B1 | 5/2001 | Horie | 439/159 |
| 6,234,813 B1 | 5/2001 | Hanyu | 439/159 |
| 6,270,365 B1 | 8/2001 | Nishioka | 439/159 |
| 6,273,737 B1 | 8/2001 | Furusho et al. | 439/159 |
| 6,290,136 B1 | 9/2001 | Koseki et al. | 235/475 |
| 6,299,465 B1 | 10/2001 | Hirata | 439/159 |
| 6,302,715 B1 | 10/2001 | Sato et al. | 439/159 |
| 6,319,029 B2 | 11/2001 | Nishioka | 439/159 |
| 6,332,790 B1 * | 12/2001 | Ishikawa et al. | 439/157 |
| 6,390,836 B1 | 5/2002 | Motegi et al. | 439/159 |
| 6,394,827 B2 * | 5/2002 | Nogami | 439/159 |
| 6,398,567 B1 * | 6/2002 | Nishimura | 439/159 |

\* cited by examiner

FIG.9A WHEN THE CARD IS EJECTED

FIG.9B WHEN THE CARD IS LOCKED

FIG.10A WHEN THE CARD IS LOCKED

FIG.10B WHEN THE CARD IS EJECTED

CARD CONNECTOR

This application is based on patent application No. 2000-319890 filed Oct. 19, 2000 in Japan, the content of which is incorporated hereinto by reference.

BACKGROUND OF THE INVENTION

1. Field of the Invention

The present invention relates to a card connector mounted on electronic devices, such as cellular phones, telephones, PDAs (personal digital assistants), portable audio devices and cameras, and more specifically to a card connector having a compact structure designed to reliably prevent an IC (integrated circuit) card from coming off.

2. Description of the Related Art

In electronic devices such as cellular phones, telephones, PDAs and cameras, a variety of functions are added by inserting an IC card with a built-in CPU or memory IC, such as a SIM (subscriber identity module) card, an MMC (multimedia card), an SD (super density) card, a Memory Stick (tradename) and a Smart Media (tradename).

To allow a removable insertion of such an IC card, the card connector has the following construction. In a connector housing of the card connector are provided a plurality of contact terminals that are connected to various signal processing circuits and a power supply circuit of an electronic device on which the card connector is mounted. The contact terminals are brought into contact with a plurality of contact pads formed on a front or back surface of the inserted IC card to electrically connect the IC card to the electronic device on which the connector is mounted.

Many of such card connectors have an eject mechanism for removing the inserted IC card from the connector.

Some of the card connectors with the eject mechanism of this kind have an elastic braking piece secured to an appropriate location in the connector housing and pressed against the card to produce a friction force acting in a direction opposite that in which the card comes off, in order to prevent the card from being pushed out rapidly and slipping off from the connector during the card ejection operation or to prevent the card from coming off the connector due to unexpected external forces during the card insertion operation.

Because the card needs to be taken out of the connector, the pressing force of the braking piece cannot be set excessively large. In a conventional card slip-off prevention mechanism using the pressing force of the braking piece, therefore, the card cannot reliably be prevented from slip-off and it easily slips off due to the causes described above or impacts.

There are growing demands in recent years on the card connector itself for smaller size, lower height and lighter weight, and therefore the card slip-off prevention mechanism needs to be reduced in size and weight.

The present invention has been accomplished under these circumstances and is intended to provide a card connector which can reliably hold the inserted card with a compact mechanism to prevent the card from slipping off.

SUMMARY OF THE INVENTION

In one aspect of the present invention, a card connector is provided for holding within a connector housing a card, formed with a recessed portion on its side surface and a plurality of contact pads on its bottom surface, in such a way that the contact pads touch contact terminals arranged in the connector housing. The card connector comprises: an eject mechanism having an eject member, the eject member moving in a card insertion direction as the card is inserted into the connector and moving in a card ejection direction to eject the card in response to a card eject operation; an elastic locking piece having a locking portion to be brought into engagement with the recessed portion of the card and a stationary portion secured to the eject member, the elastic locking piece being urged away from the card to disengage the locking portion from the recessed portion of the card when the elastic locking piece elastically recovers its original shape; and a locking piece guide means for guiding and elastically deforming the elastic locking piece to bring the locking portion into engagement with the recessed portion when the card is inserted, and for resetting the elastic locking piece from the elastic deformation to disengage the locking piece from the recessed portion when the card is ejected.

In this invention, the card is formed with the recessed portion for engagement with the locking piece, and the elastic locking piece is attached to the eject member that slides together with the card as the card is inserted or retracted. The elastic locking piece is urged away from the card so that when the elastic locking piece is elastically reset to its original shape, the locking portion is disengaged from the recessed portion of the card. The locking piece guide means guides and elastically deforms the elastic locking piece to engage the locking portion with the recessed portion when the card is inserted and, when the card is ejected, resets the elastic locking piece from the elastic deformation to disengage the locking portion from the recessed portion.

Because the present invention forcibly moves the locking portion of the elastic locking piece toward or away from the card, not according to the movement of the card itself but according to the movement of the eject member which moves similarly to the card, the locking portion of the elastic locking piece can adopt a hook-shaped locking structure that can completely restrict the movement of the card in the withdrawal direction. Further, in this invention because the elastic locking piece, when the card is locked, is pushed out and elastically deformed by the locking piece guide means, this locking structure has a stronger locking force than the conventional construction in which the elastic locking piece in an elastically reset state engages with the recess of the card when the card is locked. The locking structure of this invention can therefore prevent the card from coming off the connector inadvertently or due to unexpected external forces or impacts and thus hold the card reliably at all times during the insertion operation.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of the present invention will be described in detail by referring to the accompanying drawings.

An example card that can be inserted into a card connector of one embodiment of this invention detailed later will be explained.

Figure 1:
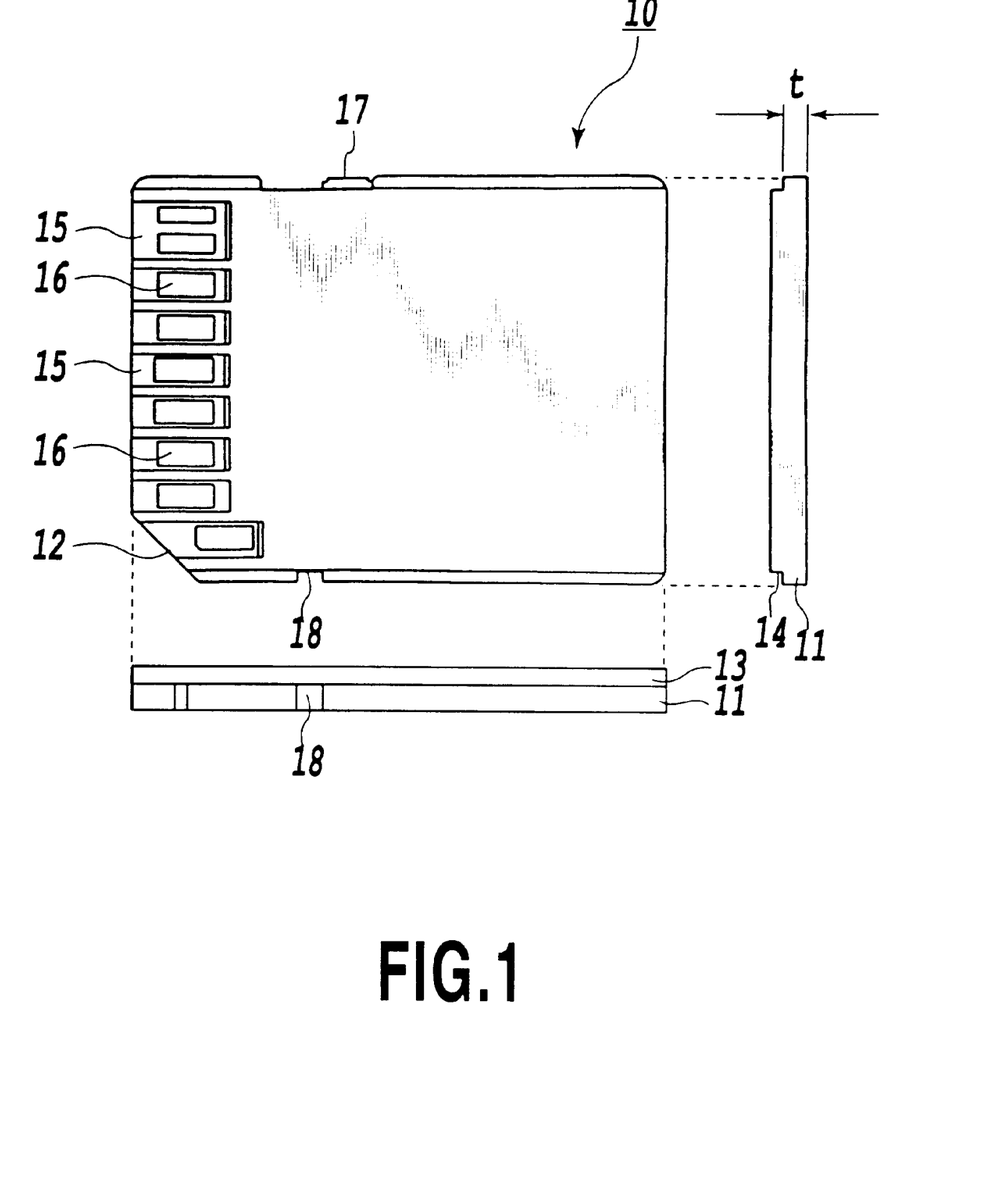
FIG. 1 illustrates views as seen in three orthogonal directions.

FIG. 1 illustrates views of a double-height card 10 represented by an SD card, as seen from three orthogonal directions. The central plan view shows the card 10 as seen from its pad surface (back or button surface).

This card 10 has an upper body portion 11 with a thickness t. The upper body portion 11 has a cut-off corner portion (inclined corner portion) 12 at the left front end portion thereof to prevent erroneous insertion. On the back surface side of the upper body portion 11 is formed a lower body portion 13 which is slightly narrower in width than the upper body portion 11. That is, the card 10 has a two-level structure in which stepped portions 14 are formed along both side edges of the card between a bottom surface of the upper body portion 11 and a bottom surface of the lower body portion 13. At a front part of the bottom surface of the lower body portion 13 a plurality of recesses 15 are formed which have arranged at their bottoms a plurality of contact pads 16 connected to an IC circuit in the card. A write protect switch 17 is provided at one side surface of the card 10.

At the other side surface of the upper body portion 11 of the double-height card 10 is formed a recessed portion 18 to securely lock the card.

Next, one embodiment of the card connector according to this invention will be described by referring to FIG. 2 to FIG. 9.

Figure 2:
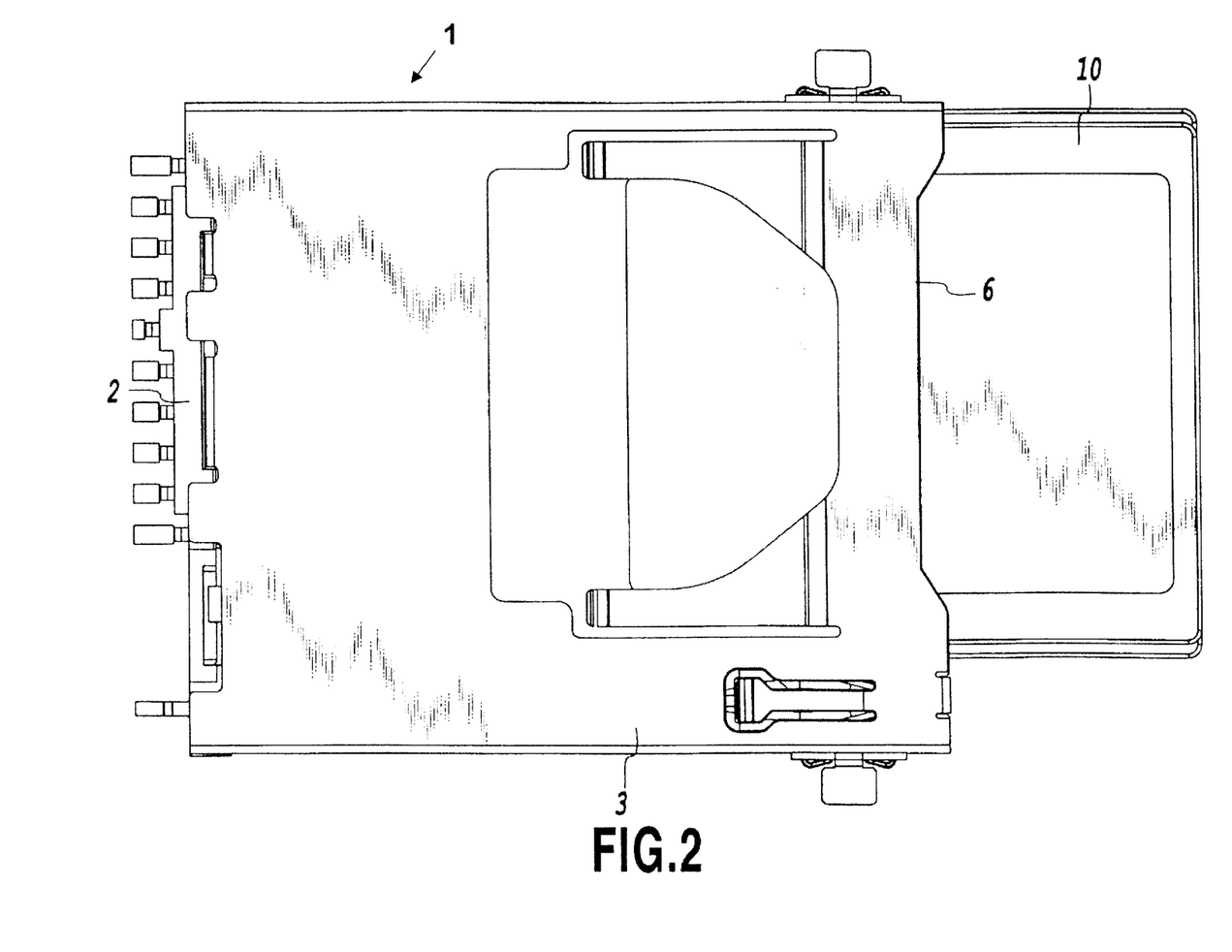
FIG. 2 is a plan view showing an external construction of a card connector of the present invention when a card is ejected.
Figure 3:
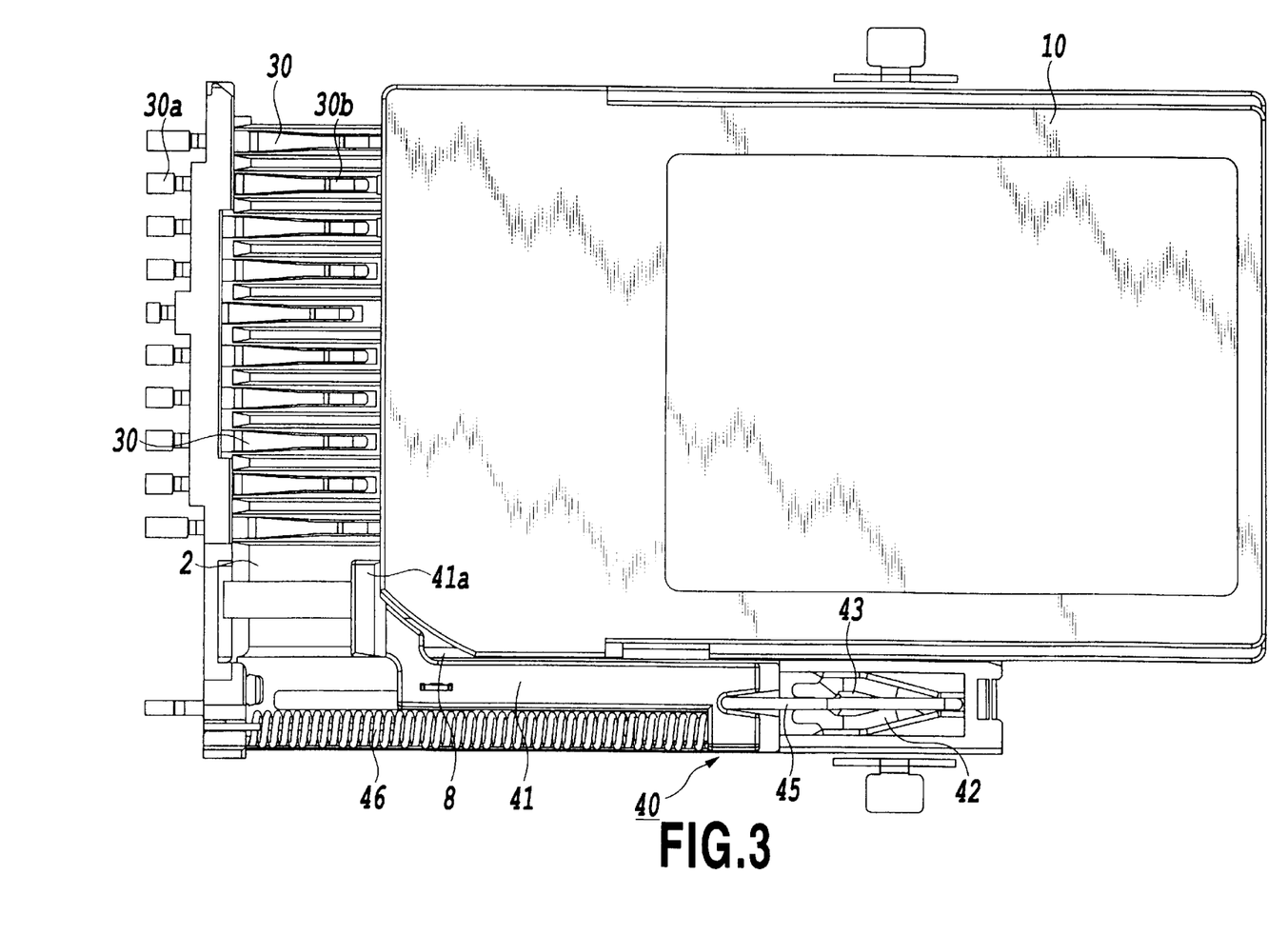
FIG. 3 is a plan view of the card connector of the invention with a metal cover removed when the card is ejected.
Figure 4:
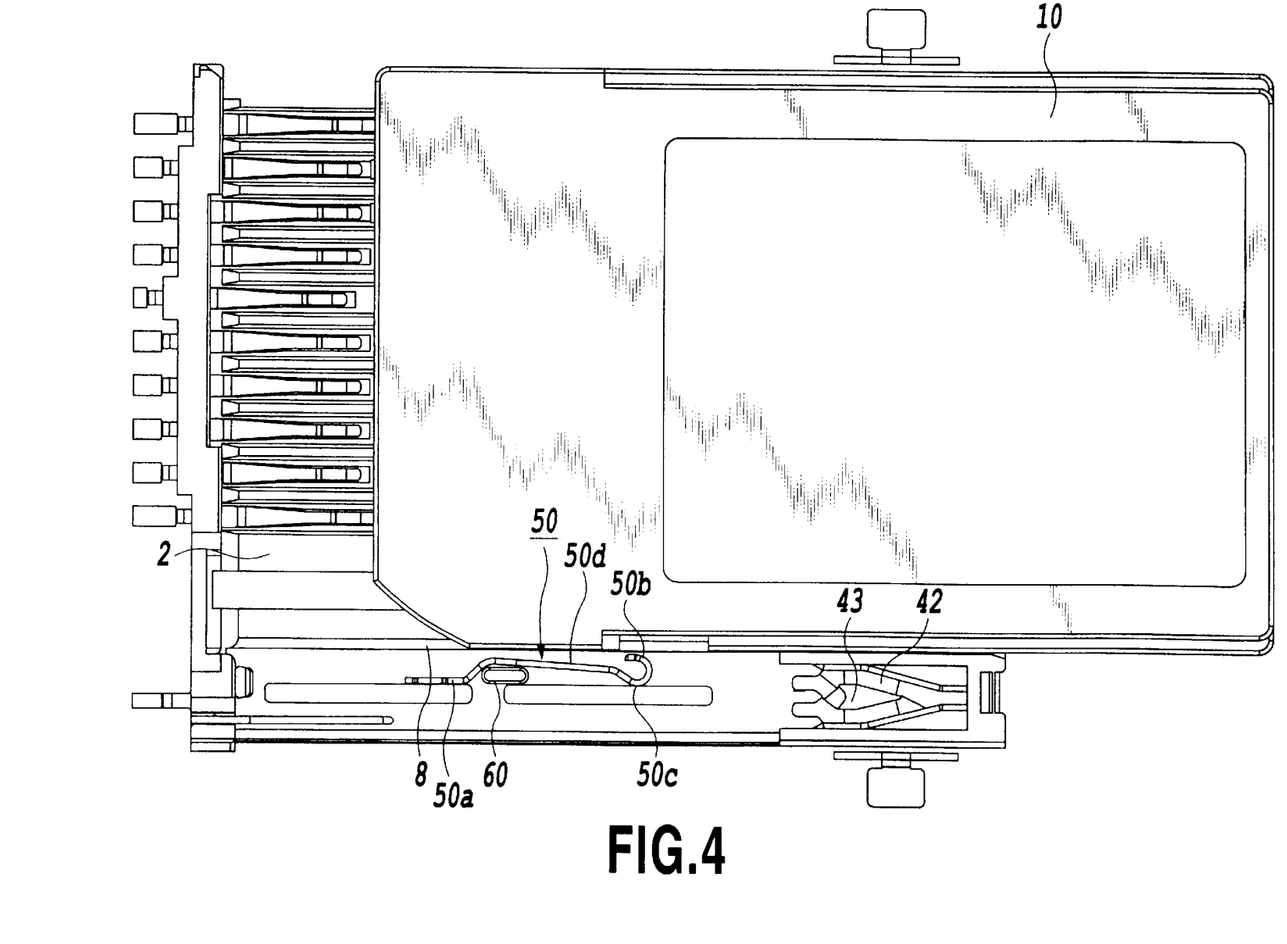
FIG. 4 is a plan view of the card connector of the invention with a metal cover and an eject member removed when the card is ejected.
Figure 5:
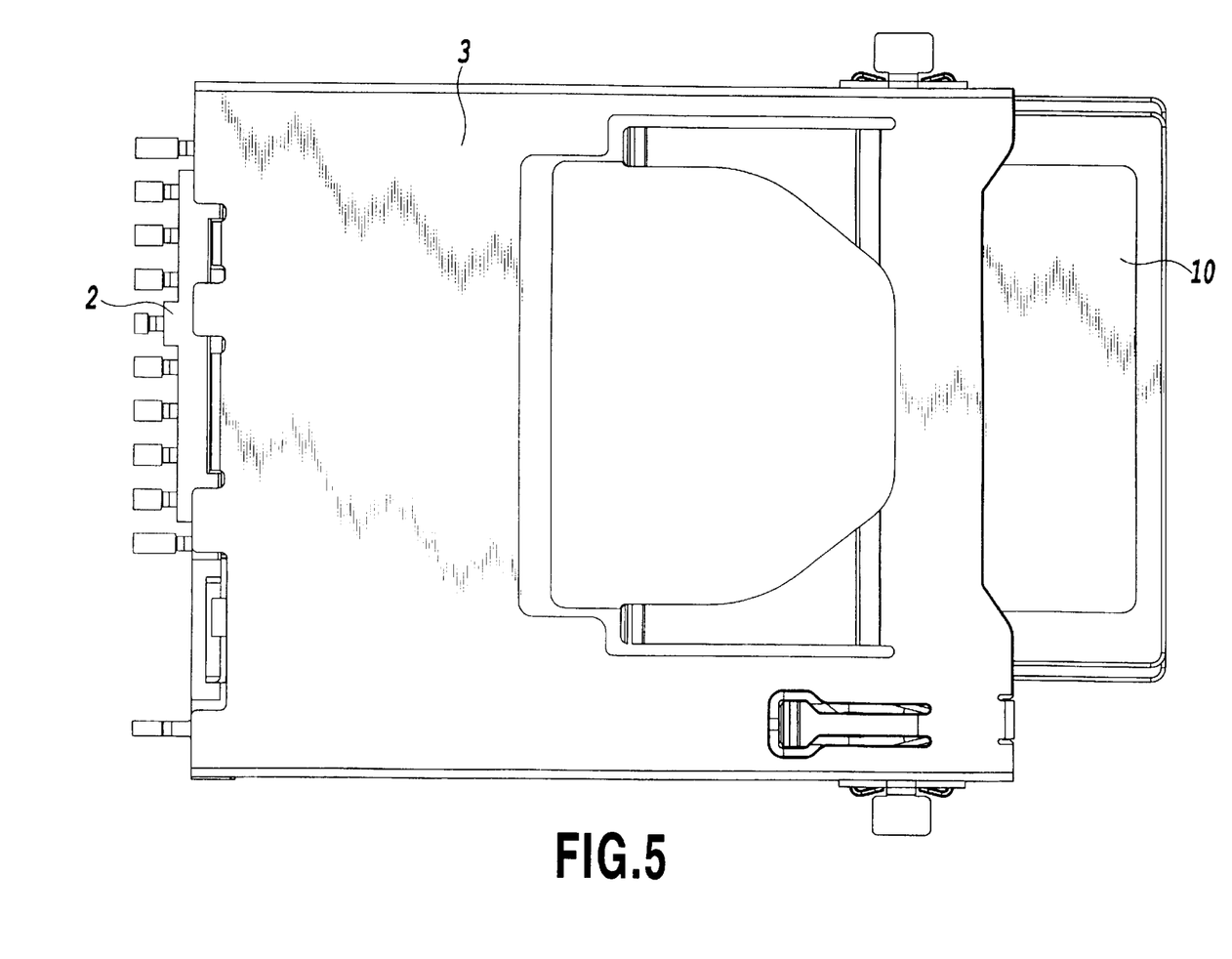
FIG. 5 is a plan view showing an external construction of the card connector of the invention when the card is locked.
Figure 6:
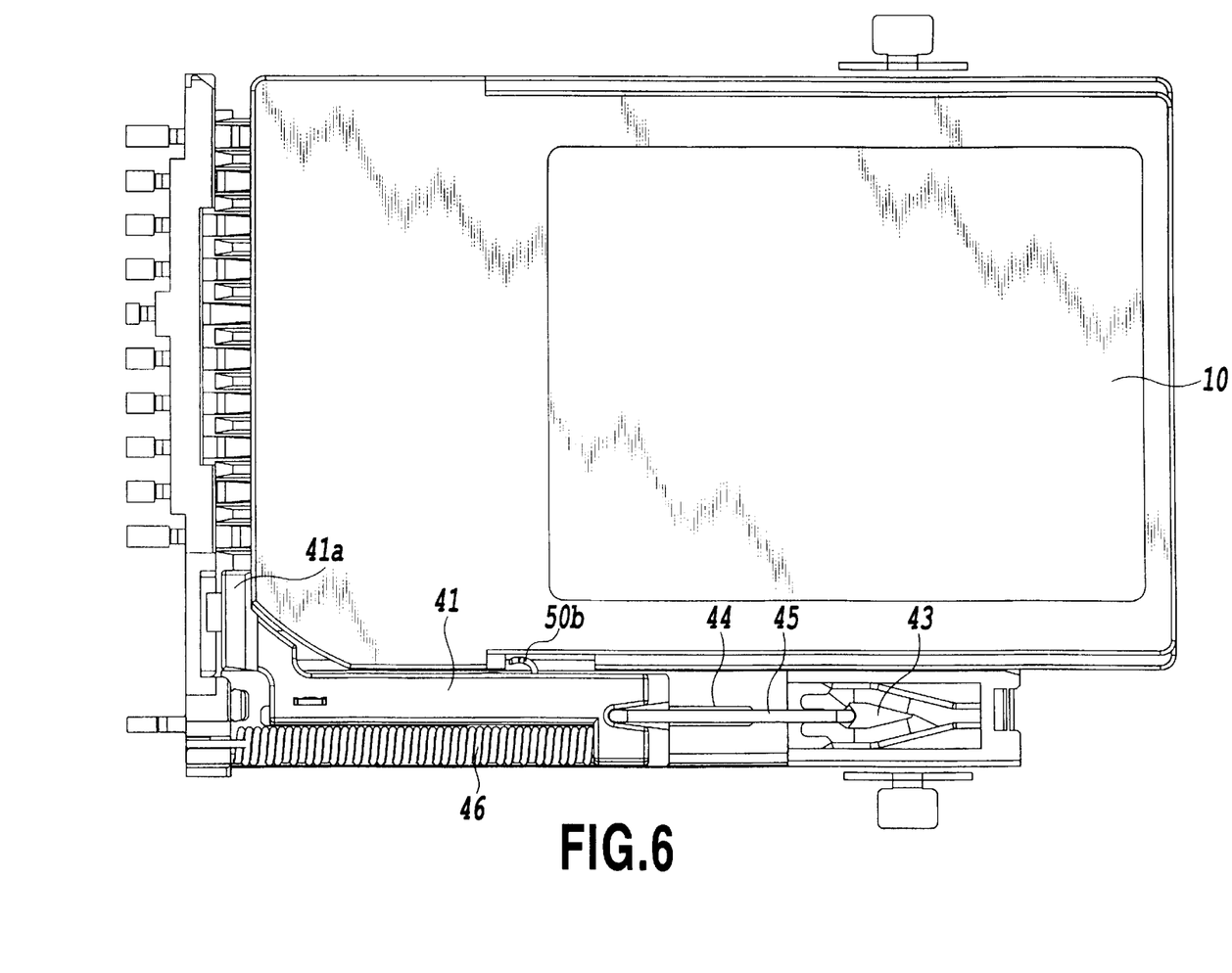
FIG. 6 is a plan view of the card connector of the invention with a metal cover removed when the card is locked.
Figure 7:
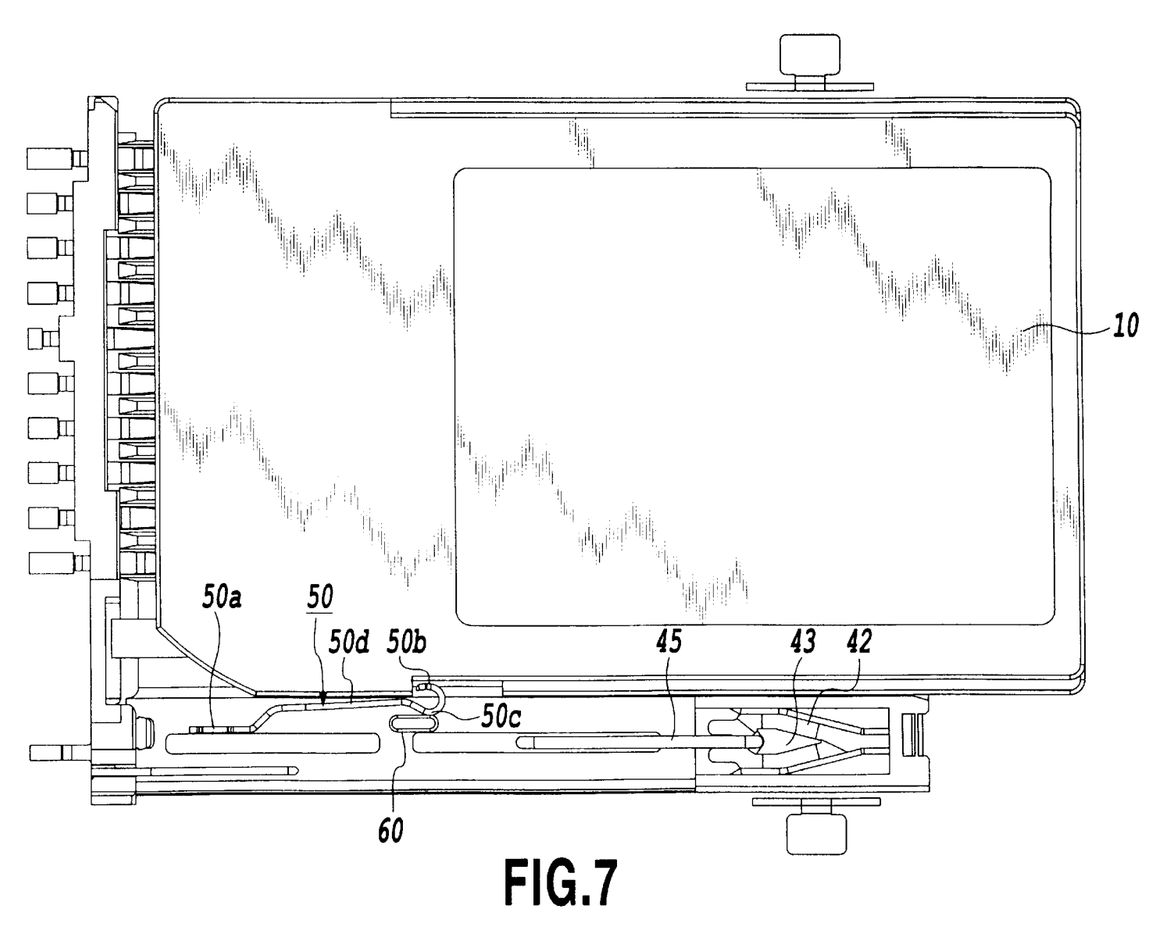
FIG. 7 is a plan view of the card connector of the invention with a metal cover and an eject member removed when the card is locked.
Figure 8:
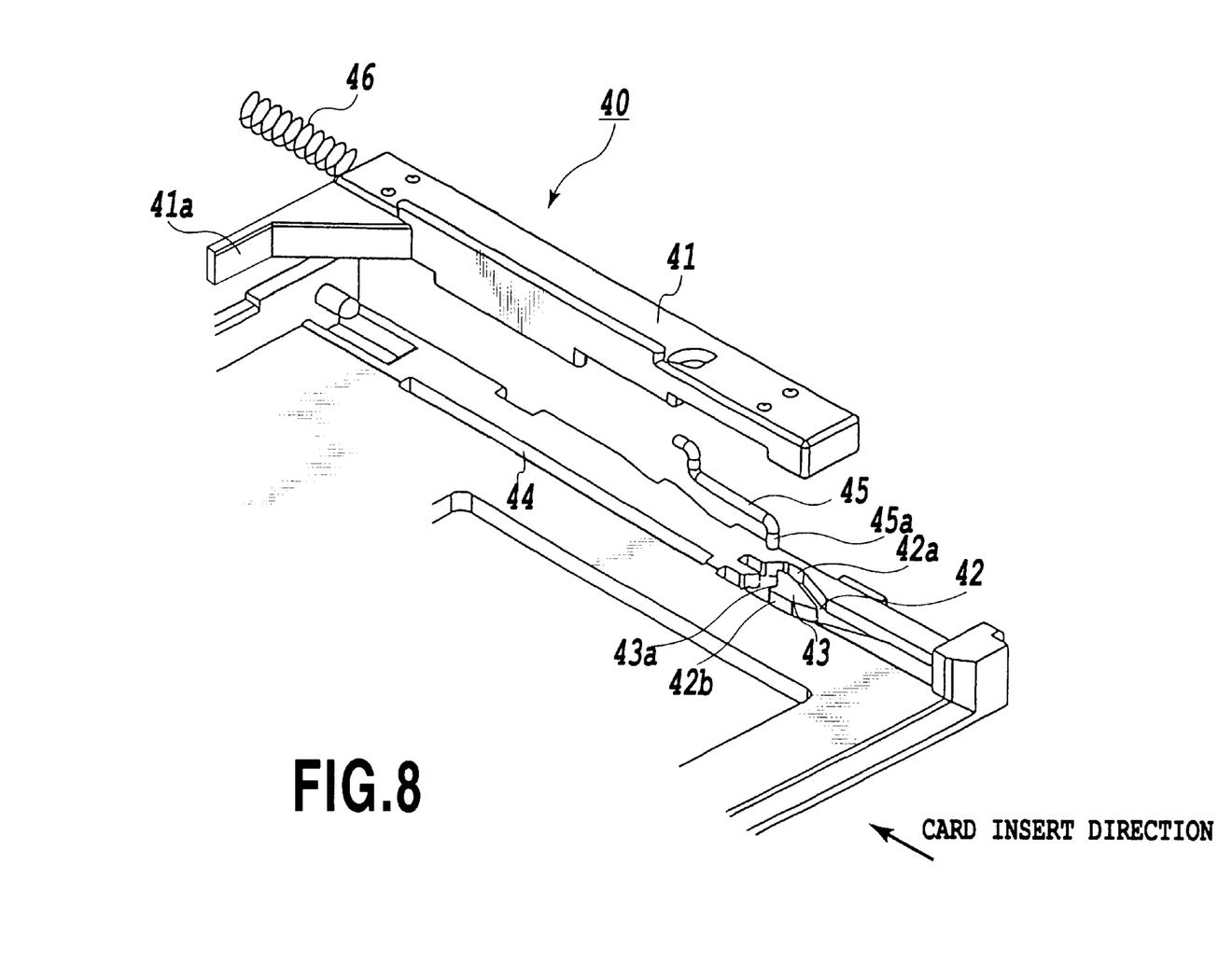
FIG. 8 is a perspective view showing a detail of a card eject mechanism.
Figure 9A:
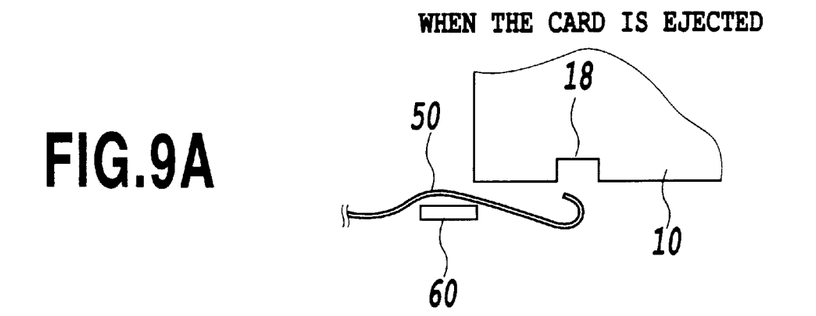
FIG. 9A and FIG. 9B are conceptual diagrams showing states of an elastic locking piece when the card is ejected and when the card is locked.
Figure 9B:
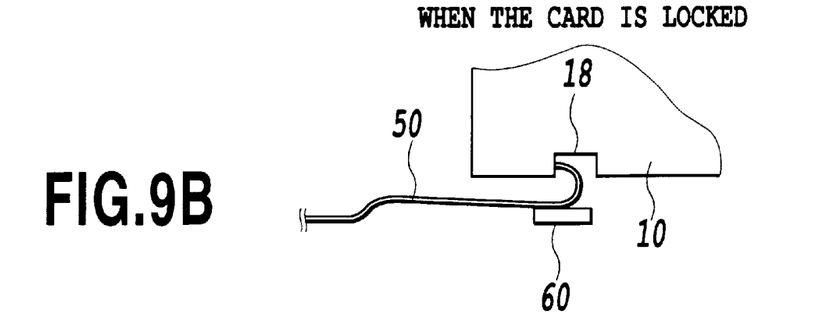

FIG. 2 is a plan view showing an external construction of the card connector 1 when the card is ejected. FIG. 3 is a plan view of the card connector with a metal cover 3 removed when the card is ejected. FIG. 4 is a plan view of the card connector with an eject member 41 also removed when the card is ejected. FIG. 5 is a plan view showing an external construction of the card connector 1 when the card is inserted (locked). FIG. 6 is a plan view of the card connector with the metal cover 3 removed when the card is locked. FIG. 7 is a plan view of the card connector with the eject member 41 also removed when the card is locked. FIG. 8 is a perspective view showing a detailed construction of an eject mechanism 40. FIG. 9 is a conceptual diagram showing states of an elastic locking piece when the card is ejected and when the card is locked.

The card connector 1 is installed in electronic devices such as cellular phones, PDAs, portable audio devices and cameras.

The card connector 1 has a connector housing 2 molded from an insulating material such as resin, and a cover (metal cover in this case) 3 covering an upper part of the connector housing 2. The connector housing 2 has a top plate, a bottom plate, side plates, and a rear plate.

A plurality of contact terminals 30 each made from a cantilevered contact leaf spring are secured to the bottom plate of the connector housing 2. Each of the contact terminals 30 has a terminal portion 30a soldered to the corresponding contact pad on a printed wiring board of the electronic device, a stationary portion (not shown) secured to the top plate of the connector housing 2, and a contact portion 30b protruding upward and elastically displaceable to receive the incoming card 10 and touch the contact pad of the card 10.

The connector housing 2 has at its front a card slot (insertion opening) 6 through which to insert the card 10 into the connector. The card 10 is inserted into the connector 1 with its surface formed with the contact pads 16 facing down. The connector housing 2 has on the far side of the card slot 6 a card accommodating portion, in which guide grooves 8 are formed on the left and right side to support the left and right side edges of the card 10 as it is inserted or withdrawn.

The card connector 1 has an eject mechanism 40 which ejects the inserted card 10 when it is slightly pushed toward the rear of the housing.

FIG. 3 and FIG. 6 show an eject member 41 of the eject mechanism 40. The eject member 41 has a card engagement portion 41a that engages the cut-off corner portion 12 and front end portion of the card 10.

The eject member 41 carries out the eject operation by the eject mechanism 40 which is shown disassembled in FIG. 8. The eject mechanism of FIG. 8 are shown to be situated on a side laterally opposite to that of FIG. 3 and FIG. 6. With reference to FIG. 8, the construction and operation of the eject mechanism 40 will be explained.

The eject mechanism 40 comprises a lever guide groove 42, a heart cam 43 and a guide groove 44, all formed in the bottom plate of the connector housing 2, and an eject member 41, a cam lever 45 supported by the eject member 41 and movable along the lever guide groove 42, and a coil spring 46 interposed between the housing bottom plate and the eject member 41.

In this eject mechanism 40, when a card is inserted into the connector 1, the eject member 41 is pushed by the card and moved toward the rear side of the connector. At this time, a front end portion 45a of the cam lever 45 moves along a right side lever guide groove 42a and is locked by a locking portion 43a of the heart cam 43. As a result, the movement of the card 10 is stopped in the connector 1, with the contact pads 16 of card 10 held in contact with the contact terminals 30 of the connector 1.

When the card is to be ejected, the inserted card is pushed toward the rear of the connector. This disengages the cam lever 45 from the locking portion 43a of the heart cam 43. Then, the front end portion 45a of the cam lever 45 is moved by the recovering force of the coil spring 46 toward the front of the connector along a left side lever guide groove 42b. Thus, the card is pushed forward by the card engagement portion 41a of the eject member 41 and thereby ejected from the connector. The guide groove 44 works as a groove for guiding the eject member 41.

In this way, the eject member 41 performs the same motion as the card when the card is inserted and ejected.

Next, the card locking mechanism (card slip-off prevention mechanism), an essential part of this invention, will be described.

The eject member 41 has an elastic locking piece 50 fixed thereto which engages with a recessed portion 18 formed in the card 10 to block the movement of the card 10.

As shown in FIG. 4 or FIG. 7, the elastic locking piece 50 is made from an elastically deformable material such as metal or resin. The elastic locking piece 50 has a stationary portion 50a secured to the eject member 41, a locking portion 50b shaped like a hook for engagement with the recessed portion 18 of the card 10, a guide engagement portion 50c protruding away from the card so that it can engage with a guide projection 60 (described later) to elastically deflect the elastic locking piece 50, and a spring portion 50d to be elastically deformed.

The eject member 41 is formed with a space for accommodating the elastic locking piece 50.

The elastic locking piece 50, as shown in FIG. 4 or FIG. 9A, is urged away from the side surface of the card 10 so that the locking portion 50b is disengaged from the recessed portion 18 of the card 10 when the elastic locking piece 50 elastically returns to its original shape.

The bottom plate of the connector housing 2, as shown in FIG. 4 and FIG. 7, is formed with a guide projection 60 extending upward which works as a locking piece guide means for guiding the elastic locking piece 50 into or out of contact with the card 10 as the eject member 41 moves.

When the card 10 is inserted, the guide projection 60 engages and pushes the guide engagement portion 50c of the elastic locking piece 50 to elastically deform the spring portion 50d and thereby fit the locking portion 50b into the recessed portion 18 of the card 10, as shown in FIG. 7 or FIG. 9B.

In the card connector structure described above, when the card is not inserted, the elastic locking piece 50 is situated at a position shown in FIG. 4 or FIG. 9A according to the standby position of the eject member 41. At this position the elastic locking piece 50 is free, not restricted by the guide projection 60. Hence, the locking portion 50b of the elastic locking piece 50 is returned to the original position spaced from the side surface of the card 10 by the elastic recovering force of the spring portion 50d. Therefore, no load is produced against the insertion of the card.

When on the other hand the card 10 is inserted, the eject member 41 is pushed and moved toward the rear of the connector 1 by the front end portion of the card 10, as shown in FIG. 6. At the same time, the elastic locking piece 50 is also moved toward the rear of the connector 1 until it finally reaches the position shown in FIG. 7. When during this movement the guide engagement portion 50c of the elastic locking piece 50 comes to the position of the guide projection 60, it is pushed toward the side surface of the card 10 by the guide projection 60. Hence, the spring portion 50d of the elastic locking piece 50 is elastically deformed, causing the locking portion 50b of the elastic locking piece 50 to fit into the recessed portion 18 of the card 10, as shown in FIG. 7 or FIG. 9B.

In this locked state, because the hook-shaped locking portion 50b fits in the recessed portion 18 of the card 10 with the front end of the locking portion 50b completely blocking the card 10 from being displaced in the card withdrawal direction, the card 10 will not come off inadvertently or by external forces. Further, in the construction of this embodiment, when the card is locked, the guide projection 60 prevents the elastic locking piece 50 from returning to its original shape by its elastic recovery force. This embodiment provides a locking structure with a stronger locking force than in the conventional construction in which the elastic locking piece in a free, elastically reset state engages with the recessed portion of the card.

Next, when the eject operation is performed by pushing the inserted card 10 further rearward, the eject mechanism 40 is unlocked, causing the eject member 41 to move forwardly of the connector by the recovering force of the coil spring 46. The movement of the eject member 41 forces the card 10 and the elastic locking piece 50 toward the front of the connector. As a result, the elastic locking piece 50 disengages from the guide projection 60 and becomes free from the restriction by the guide projection 60, with the locking portion 50b of the elastic locking piece 50 moving away from the side surface of the card 10 by the elastic recovery force of the spring portion 50d until it stops at a position out of contact with the side wall of the card 10. Now, the card 10 is unlocked, not loaded with any contact pressure from the elastic locking piece 50, and therefore can be drawn out from the connector.

With this embodiment, the card locking mechanism is characterized in that the card 10 is formed with a recessed portion 18, that the elastic locking piece 50 is attached to the eject member 41 which slides together with the card as the card is inserted or withdrawn, and that, when the card is inserted or withdrawn, a part of the elastic locking piece 50 is guided by the guide projection 60 formed in the connector housing 2 to bring the locking portion 50b of the elastic locking piece 50 into or out of engagement with the recessed portion 18 of the double-height card 10. Therefore, the card locking mechanism can adopt, for the locking portion 50b of the elastic locking piece 50, the hook-shaped locking structure as described above which can perfectly restrict the movement of the card in the withdrawal direction. This in turn can prevent the card 10 from slipping off inadvertently or due to unexpected external forces and can reliably hold the card as it is inserted.

Although in the embodiment above the guide projection 60 extends upwardly from the bottom plate of the connector housing, it may be projected downwardly from the metal cover 3.

Further, in the embodiment above, while the elastic locking piece 50 is elastically moved toward or away from the side surface of the card, it is also possible to elastically move up or down the elastic locking piece 50 toward or away from the bottom surface of the card to bring the locking portion 50b of the elastic locking piece 50 into or out of engagement with the recessed portion 18 of the card 10. In this case, the guide projection 60 is arranged at an appropriate position to guide the vertically displaceable elastic locking piece 50 into or out of the recessed portion 18 of the card 10.

Figure 10A:
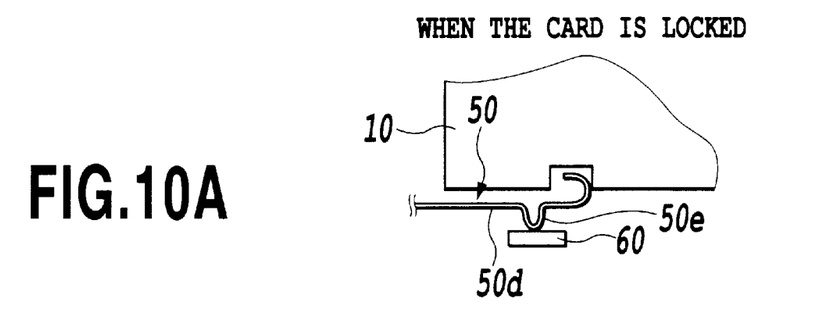
FIG. 10A and FIG. 10B are conceptual diagrams of another embodiment of the invention.
Figure 10B:
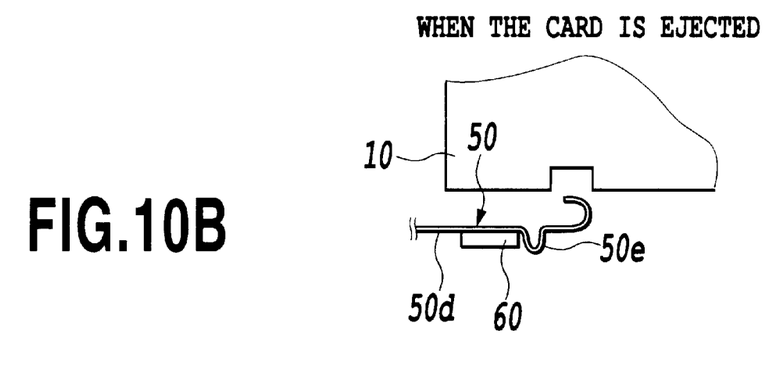

Further, while in the embodiment above the back side of the hook-shaped locking portion 50b of the elastic locking piece 50 is protruded and this protruded portion 50c is engaged with the guide projection 60 to elastically displace the elastic locking piece 50 toward the card 10, the part of the elastic locking piece 50 that is engaged with the guide projection 60 is arbitrary. For example, as shown in FIG. 10, a projecting portion 50e may be formed at some midpoint in the spring portion 50d of the elastic locking piece 50 and engaged with the guide projection 60 to elastically displace the elastic locking piece 50 toward the card 10. Further, the locking portion 50b of the elastic locking piece 50 may also be provided at an arbitrary location other than the front end of the elastic locking piece 50.

The locking piece guide means 60 may also take any arbitrary form. What is required of the construction of the guide means 60 is a function to guide and elastically deflect the elastic locking piece 50 to engage the locking portion 50b of the elastic locking piece 50 with recessed portion 18 of the card 10 when the card is inserted, and a function to reset the elastic locking piece 50 from the elastic deformation to disengage the elastic locking piece 50 from the recessed portion 18 when the card is ejected.

In this invention, an ordinary single-height card may also be formed with a recessed portion 18 and locked by the elastic locking piece 50.

The eject mechanism shown in FIG. 8 is only one example and the eject mechanism may have any arbitrary construction. The present invention is also applicable to a construction in which the eject operation is done by operating an eject button.

While the embodiment above has described an SD card as an example of the card 10, the present invention can be applied to any arbitrary kind of card.

The connector housing that applies the present invention may employ any other arbitrary shape and material.

As described above, the present invention forcibly moves the locking portion of the elastic locking piece toward or away from the card, not according to the movement of the card itself but according to the movement of the eject member which moves similarly to the card. Thus the locking portion of the elastic locking piece can adopt a hook-shaped locking structure that can completely restrict the movement of the card in the withdrawal direction. This can prevent the card from slipping off the connector inadvertently or due to unexpected external forces or impacts and thus hold the card reliably at all times during the insertion operation.

Further in the card connector of this invention, because, when the card is locked, the elastic locking piece is kept by the locking piece guide means from elastically recovering its original shape, a locking structure can be provided which has a stronger locking force than the conventional construction in which the elastic locking piece in a free, elastically reset state engages with the recess of the card.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector for holding within a connector housing a card, formed with a recessed portion on its side surface and a plurality of contact pads on its bottom surface, in such a way that the contact pads engage contact terminals arranged in the connector housing, the card connector comprising:

an eject mechanism having an eject member, the eject member moving in a card insertion direction as the card is inserted into the connector and moving in a card ejection direction to eject the card in response to a card eject operation;

an elastic locking piece having a locking portion to be brought into engagement with the recessed portion of the card and a stationary portion secured to the eject member, the elastic locking piece being urged away from the card to disengage the locking portion from the recessed portion of the card when the elastic locking piece elastically recovers its original shape; and a locking piece guide means for guiding and elastically deforming the elastic locking piece to bring the locking portion into engagement with the recessed portion when the card is inserted, and for resetting the elastic locking piece from the elastic deformation to disengage the locking piece from the recessed portion when the card is ejected.

2. A card connector as claimed in claim 1, wherein the elastic locking piece is provided in a side wall portion of the connector housing and can be displaced in a width direction of the card, and the locking piece guide means is a member protruding from the connector housing which engages a part of the elastic locking piece to elastically deform the elastic locking piece when the card is inserted.

3. A card connector as claimed in claim 1, wherein the locking portion of the elastic locking piece is hook-shaped.

* * * * *